Figure 1:
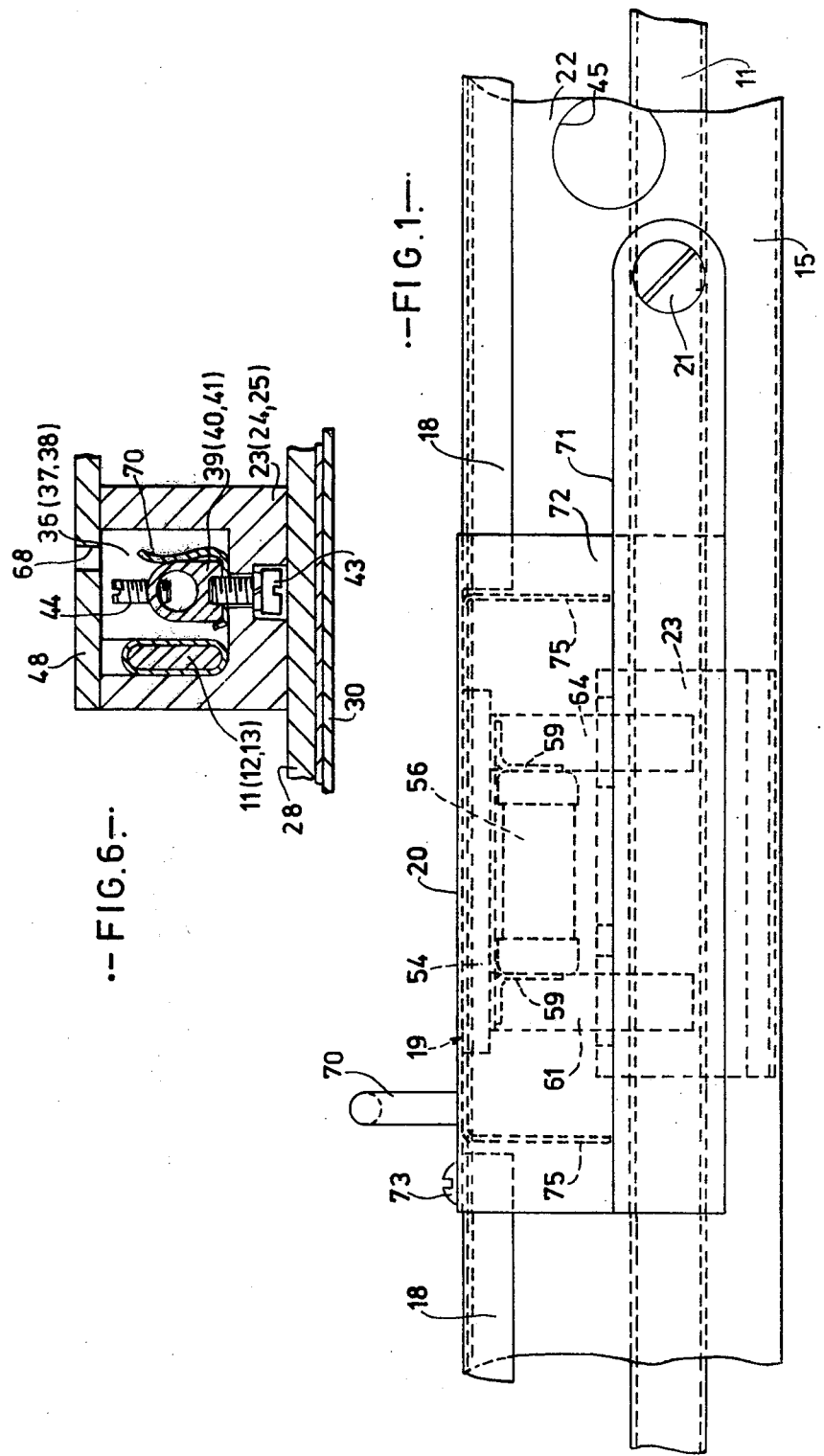

United States Patent [19]

Nicholls

[11] 4,183,608
[45] Jan. 15, 1980

[54] ELECTRICAL DISTRIBUTION SYSTEMS

[75] Inventor: Wilfrid Nicholls, Liverpool, England

[73] Assignee: Maxam Switchgear Limited, Liverpool, England

[21] Appl. No.: 870,576

[22] Filed: Jan. 18, 1978

[30] Foreign Application Priority Data

Jan. 19, 1977 [GB] United Kingdom ................. 2044/77

[51] Int. Cl.² ........................................... H01R 13/68
[52] U.S. Cl. .............................. 339/147 R; 339/22 B
[58] Field of Search ............... 337/186, 191, 194, 196, 337/144; 361/432, 349, 350; 339/22 B, 147 R, 147 C, 147 P

[56] References Cited

U.S. PATENT DOCUMENTS

| 2,318,861 | 5/1943 | Huguelet | 339/147 P |
|---|---|---|---|
| 2,334,810 | 11/1943 | Demask | 339/22 B |
| 2,423,227 | 7/1947 | Cole | 337/196 |
| 2,581,308 | 1/1952 | Smith | 337/186 |
| 3,056,870 | 10/1962 | Andres | 337/196 |
| 3,107,283 | 10/1963 | Durham | 337/191 |
| 3,154,722 | 10/1964 | Cole | 361/432 |
| 3,202,788 | 8/1965 | George | 337/194 |
| 3,229,066 | 1/1966 | Rowe | 337/191 X |

FOREIGN PATENT DOCUMENTS 824260 11/1959 United Kingdom ................. 339/22 B
928581 6/1963 United Kingdom ................. 339/22 B Primary Examiner—Joseph H. McGlynn
Assistant Examiner—John S. Brown
Attorney, Agent, or Firm—Charles E. Brown

[57] ABSTRACT

A fused tap-off unit for a busbar system is disposed in a length of trunking through which busbars extend. The trunking has a cover inside which fuses are fitted. The fuses interconnect contact blades of which a first set contact the busbars when the cover is closed and a second set contact tap-off terminals loosely secured in insulators. When the cover is opened by pivoting about a hinge axis, the contact blades secured to the cover are withdrawn, whereby the fuses and the tap-off terminals are isolated from the busbars. The busbars also extend through the insulators so that there is no danger of touching live parts when the cover is opened.

13 Claims, 6 Drawing Figures

ELECTRICAL DISTRIBUTION SYSTEMS

The present invention relates to busbar systems and more particularly to fused tap-off units for busbar systems.

Hitherto, fused tap-off units have comprised a separate fuse box whose input terminals have to be individually connected to the busbars. Fuse cartridges inside the tap-off unit connect the input terminals to output terminals which may be connected directly to a load. Switching means are associated with the tap-off unit for isolating the fuse cartridges so that the latter can be safely exchanged.

An object of the invention is to simplify the construction of fused tap-off units, thereby reducing costs.

According to one aspect of the present invention, a fused switch tap-off unit for a busbar system enclosed in trunking, is incorporated within a length of trunking through which busbars extend in parallel relationship, the trunking having a cover which can be opened to give access to fuses and preferably also to output terminals which are connected by the fuses to the busbars and to which a load can be connected, the arrangement being such that the cover cannot be opened without isolating the fuses from the busbars.

Preferably the arrangement is such that the act of opening the cover automatically disconnects the fuses, at least from the busbars.

According to another aspect of the invention, a fused switch tap-off unit for a busbar system comprises a length of trunking having busbars supported therein in parallel relationship, insulator means disposed in the trunking and containing a first set of switch contacts associated with respective ones of said busbars and a second set of switch contacts associated with respective output terminals, the trunking having a cover to which first and second sets of switch blades are insulatedly attached so that the blades engage respective ones of the contacts when the cover is closed with the blades of the first set contacting the respective busbars and the blades of the second set contacting the output terminals and so that the switch blades are disengaged from the contacts when the cover is opened, the cover being adapted to receive fuses which interconnect respective ones of the switch blades of the first and second sets.

Preferably the cover is hinged to the trunking to ensure that the blades register with the contacts.

Conveniently the insulating means comprise a separate insulator body housing each contact of the first set and the corresponding contact of the second set can be housed in the same insulator body.

Advantageously and internal insulating cover is provided for the second set of switch contacts and can be removed to give access to the output terminals. A separate insulating cover can be provided for the first set of switch contacts.

Each switch contact of the first set can be provided with a spring clamp for clamping the inserted switch blade against the respective busbar.

Figure 2:
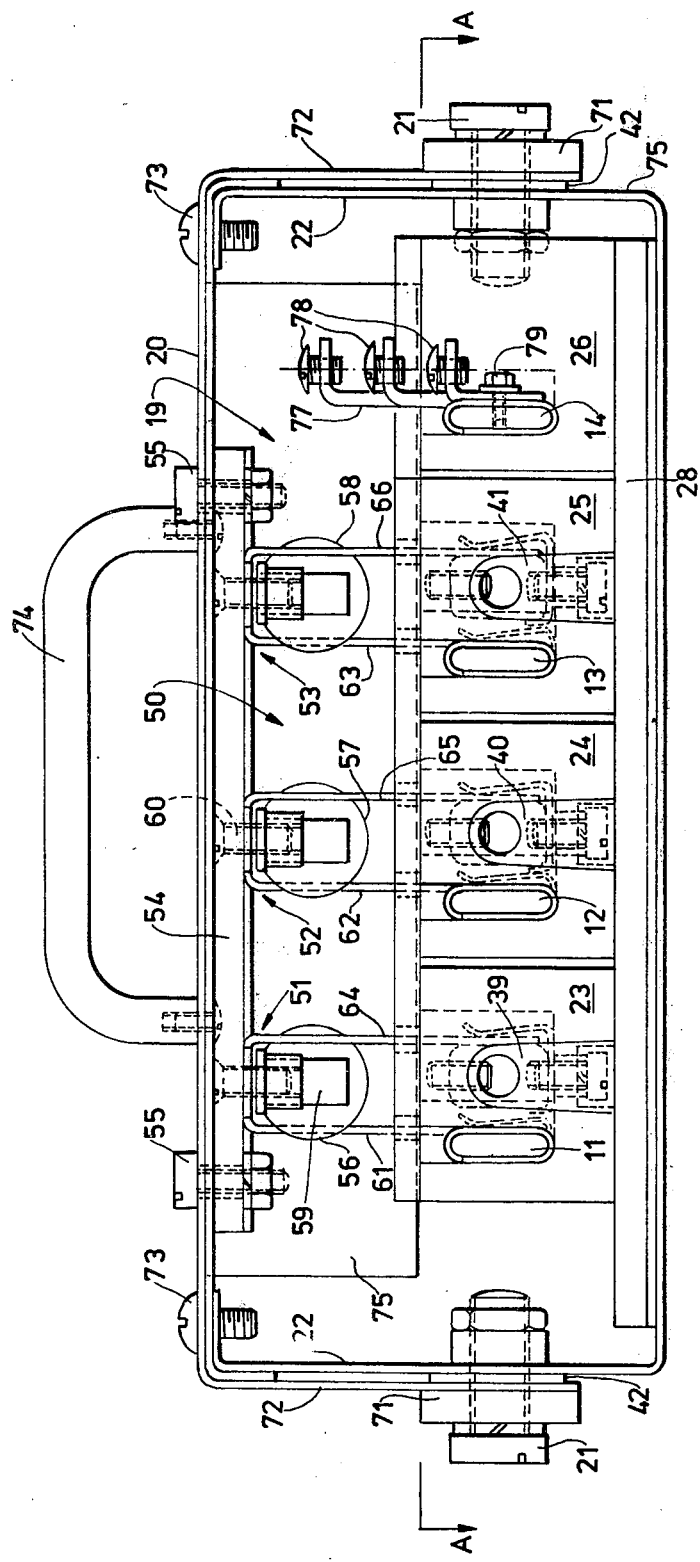
Figure 3:
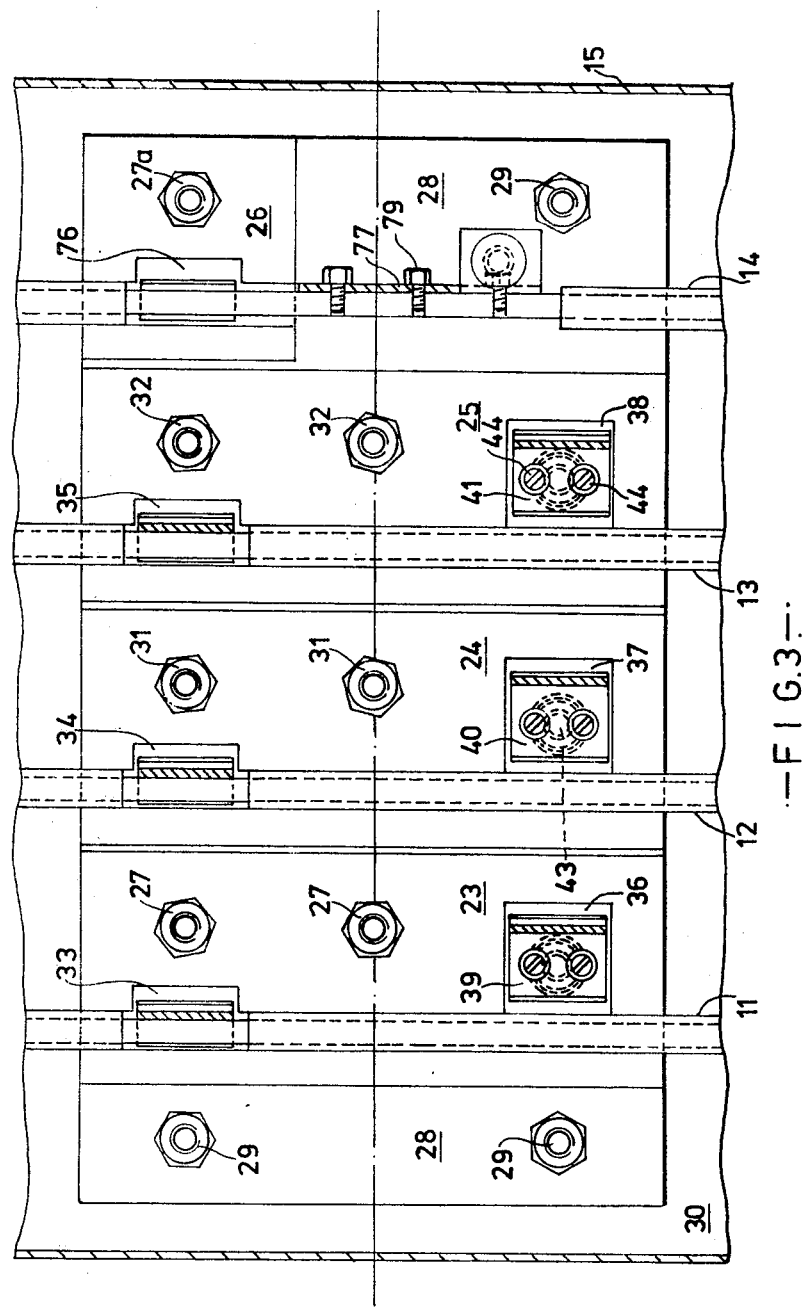
Figure 4:
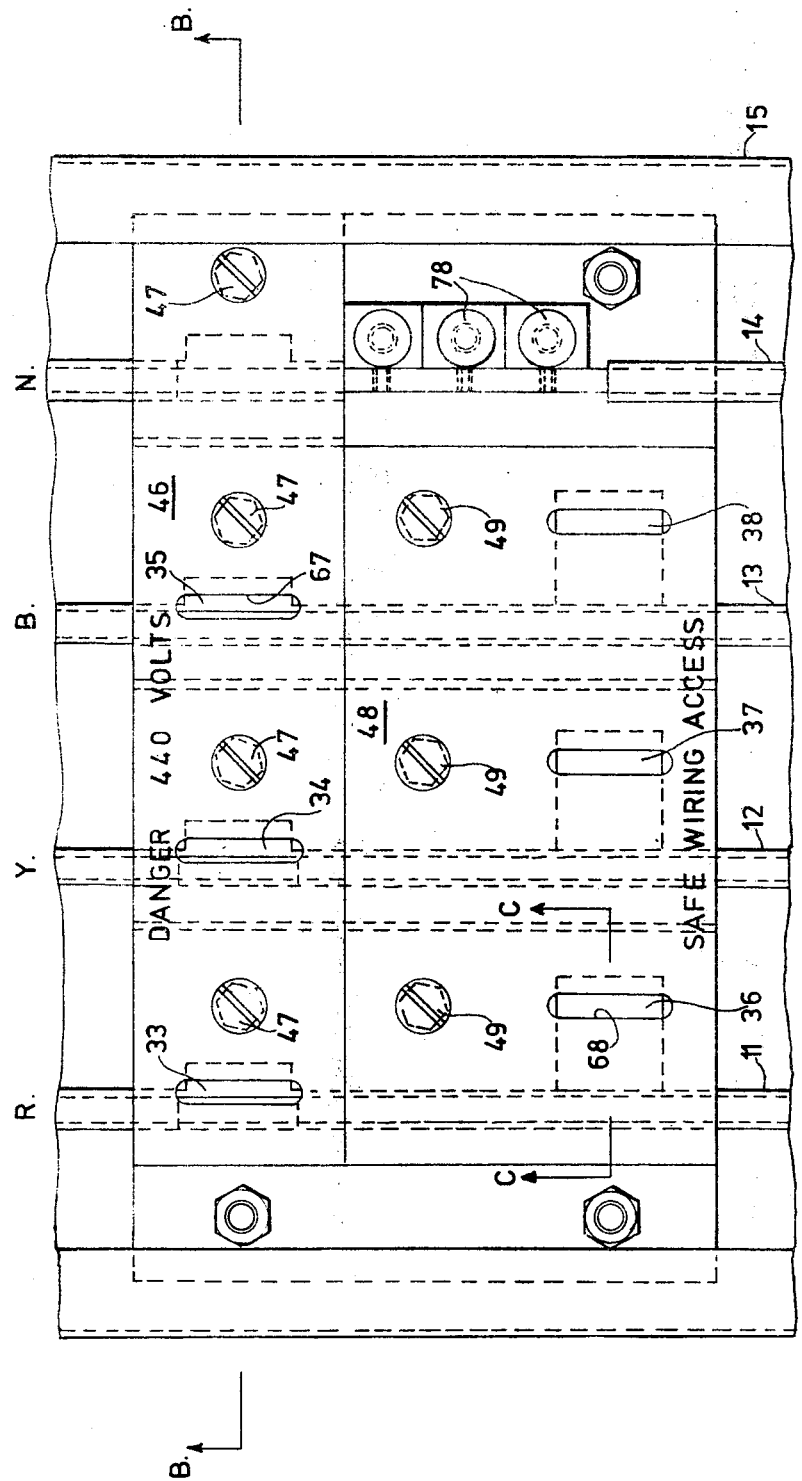
Figure 5:
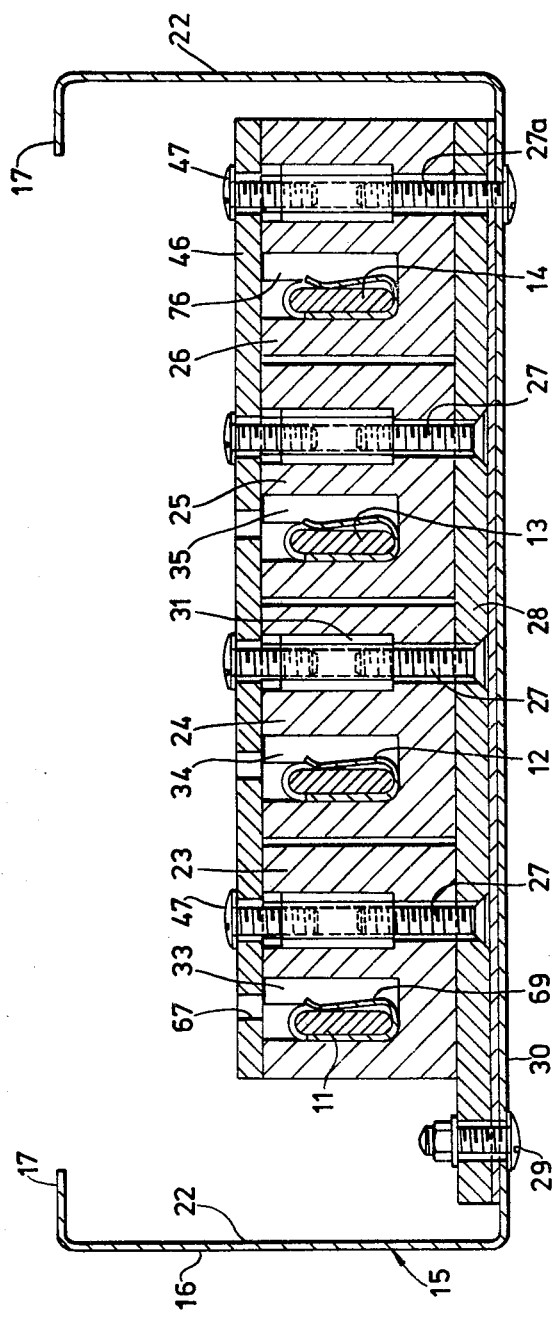

The invention is further described, by way of example, with reference to the accompanying drawings, in which:

FIG. 1 is a side elevation of busbar trunking incorporating a fused switch tap-off unit in accordance with the present invention, FIG. 2 is an end elevation of the tap-off unit, FIG. 3 is a section on the line A—A of FIG. 2, FIG. 4 is a plan view of the unit with the cover and fuse assembly removed, FIG. 5 is a section on the line B—B of FIG. 4, and FIG. 6 is a fragmentary section on the line C—C of FIG. 4.

Referring to the drawings, four busbars 11, 12, 13, 14 extend in parallel relationship longitudinally along a length of trunking or ducting 15. The ducting 15 comprises a channel 16, as shown in FIG. 5, with inturned lips 17. The channel 16 is closed over most of its length by lids 18 which are secured to the channel 16 by screws (not shown), screwed into the lips 17 to form a front wall. The lids 18 are spaced apart, as shown in FIG. 1, to define an access opening to a fused switch tap-off unit 19 which is wholly accommodated within the ducting 15. This access opening formed in the front wall is closed by a cover 20 which is hinged by two screws 21 to the trunking side walls formed by the side flanges 22 of the channel 16.

The tap-off unit comprises insulating blocks 23, 24, 25, 26 of which the blocks 23 to 25 are each secured by two screws 27 to an insulating plate 28 and the block 26 is secured by a screw 27a to the insulating plate, which is itself secured by the screw 27a and by screws 29 to the web 30 of the channel 16. Each screw 27 or 27a is screwed into a hexagonal bush or nut 31 which is received in a corresponding hexagonal socket 32 in the respective insulating block. The busbars 11 to 14 pass through and are supported by the insulating blocks 23 to 26, respectively and are also supported by additional insulators (not shown) inside the trunking 15.

Each insulating block 23, 24, 25 defines a respective cavity 33, 34, 35 of a first set of cavities and a respective cavity 36, 37, 38 of a second set of cavities. Each of the busbars 11, 12 and 13 is a phase conductor for a 3-phase mains distribution system and each is exposed in a respective cavity 33, 34 or 35 of the first set. Each of three output terminals 39, 40, 41 is loosely secured in a respective cavity 36, 37 or 38 of the second set by a screw 43, as shown in FIG. 6. Each output terminal 39, 40, 41 has two cable core clamping screws 44 by which the end of a respective conductor (not shown) leading to a load can be connected to the terminal. Such conductors can be led out of the trunking 15 through a hole 45 (FIG. 1) in one of the flanges 22 of the channel 16.

An internal insulating cover 46 is secured in place by screws 47 so that the internal cover 46 overlies the cavities 33, 34, 35 of the first set and a separate internal insulating cover 48 is secured in place by screws 49 so that the cover 48 overlies the cavities 36, 37, 38 of the second set and the output terminals 39, 40, 41. The screws 47 and 49 are screwed into the hexagonal bushes 31.

As shown in FIGS. 1 and 2, the tap-off unit 19 includes a fuse assembly 50 which is attached to the inside face of the cover 20. The fuse assembly 50 comprises three fuse holders 51, 52, 53 mounted on an insulating plate 54 which is secured to the cover 20 by screws 55 and which is adapted to receive a respective cartridge fuse 56, 57 or 58. Each holder 51, 52, 53 comprises a pair of angular lugs 59 respectively, attached by screws 60 to the insulating plate 54. Each cartridge fuse 56, 57, 58 is clamped by and between the respective pair of lugs 59. An angled end of a respective switch blade 61, 62, 63 of a first set is secured beneath one of the lugs 59 and a respective switch blade 64, 65, 66 of a second set is secured beneath the other of the lugs 59.

The switch blades 61 to 66 are so arranged and spaced that each can pass through a respective slot 67 (FIGS. 4 and 5) or 68 (FIGS. 4 and 6) in the internal cover 46 or 48 into a respective one of the cavities 33 to 38 when the cover 20 is closed, as shown in FIGS. 1 and 2. A spring clamp 69 (FIG. 5) is hooked beneath each of the busbars 11 to 13 to press the inserted blade 61, 62, or 63 against the respective busbar and a spring clamp 70 (FIG. 6) is hooked beneath each of the terminals 39, 40, 41 to press the inserted blade 64, 65 or 66 against the respective terminal for the purpose of ensuring good electrical contact. The spring clamps 69, together with the adjoining portions of the busbars 11 to 13, thereby form switch contacts of a first set for receiving the switch blades 61 to 63, respectively, and the spring clamps 70, together with the terminals 39 to 41, thereby form switch contacts of a second set for receiving the switch blades 64 to 66, respectively.

The hinge screws 21 for the cover 20 pass through free ends of arms 71 which extend from deep side flanges 72 of the cover 20, so that the cover is pivotable about a transverse hinge axis longitudinally spaces from the access opening whereby the blades 61 to 66 describe arcs of relatively large radius when the cover is opened. Furthermore, the hinge axis intersects the busbars 11 to 14, as can be appreciated from the position of the screws 21 as shown in FIG. 1. This ensures that the blades are inserted in and withdrawn from the switch contacts in the cavities 33 to 38 approximately rectilinearly and in the longitudinal direction of the switch blades 61 to 66. Removable screws 73 secure the cover 20 in position and the cover is provided with a handle 74 so that it can be opened easily. The mounting of all six switch blades on the cover and the arrangement of all three of the blades 61 to 63 of the first set equidistantly from the hinge axis of the cover ensures that all three phase circuits are interrupted and closed substantially simultaneously when the cover 20 is opened and closed. The three blades 64 to 66 of the second set are likewise equidistant from the hinge axis. Slight freedom of lateral movement of the busbars 11, 12, 13 and slight freedom of movement of the terminals 39, 40, 41 compensates for manufacturing tolerances in the positioning of the switch blades on the cover and the hinge axis of the cover on the trunking. Baffles 75 are arranged inside the cover 20 to prevent anyone from gaining access to the interior of the tap-off unit 19 until the cover has been opened sufficiently to isolate the fuses.

When the cover 20 has been opened the fuse cartridges 56 to 58 are isolated and can be safely exchanged. After removing the screws 49 the internal cover 48 can be removed to give access to the terminals 39 to 41 which are also now isolated from the busbars. The cover 46 for the cavities 33 to 35 containing the live contacts can be coloured a distinctive colour, such as red, and can have a suitable legend, e.g. "DANGER 440 VOLTS", whereas the cover 48 can be coloured green and can have the legend "SAFE WIRING ACCESS".

In the case of a very large tap-off unit in which substantial force is required to insert and withdraw the switch blades, a toggle mechanism or a lever mechanism (not shown) can be provided to afford a mechanical advantage when opening and closing the cover.

The fourth busbar 14 is a neutral conductor with which the tap-off unit 19 does not have an associated fuse.

The insulating block 26 for the neutral busbar 14 only has a supporting function and is smaller than the insulating blocks 23 to 25. However the block 26 is formed with a dummy socket 76 to simplify manufacturing techniques. A neutral terminal 77 having terminal screws 78 is attached directly to the busbar 14 by screws 79 and is not covered by the internal cover 48.

The busbars 11 to 14 are provided with insulating sheaths. The sheaths on the phase conductors 11, 12, 13 are broken away only in the regions of the cavities 33, 34, 35. The sheath on the neutral busbar 14 is broken away in the region of the dummy socket 76 and the neutral terminal 77. The busbars 11 to 14 with their sheaths are received with clearance in slots in the insulating blocks 23 to 26 so as to permit the slight movement of the busbars mentioned above.

It will be seen that the switch contacts of the second set, associated with the output terminals, are approximately midway between adjoining busbars and longitudinally spaced from the live contacts of the first set. The space available inside the trunking is thereby used to maximum advantage to accommodate the fused switch tap-off unit without increasing the cross sectional dimensions of the trunking. Future provision for fused switch tap-off units can be made by installing trunking ready fitted with the insulating blocks containing the switch contacts and the output terminals. It is then only necessary later to fit a cover provided with a fuse assembly to complete the tap-off unit.

Brass washers 42 are provided on the hinge screws 21 and are disposed between the arms 71 and the side flanges 22 of the channel 16. The portions of the arms 71 and the flanges 22 which are engaged by the washer 42 comprise bare metal to ensure good electrical contact. The cover 20 is thereby well earthed to the ducting channel 16.

We claim:

1. A fused switch tap-off assembly for a busbar system comprising in combination a length of trunking having opposed side walls and a front wall with an access opening therein; a cover for closing said access opening; side arms on said cover; pivot means pivoting said side arms respectively to said trunking side walls at points longitudinally spaced from said access opening whereby the cover can be pivoted about a transverse hinge axis between closed and open positions; busbars supported longitudinally in said trunking in spaced parallel relationship; and a fused switch tap-off unit, said unit comprising insulator means disposed within said trunking and about and between said busbars, output terminals in said insulator means between said busbars, a first set of switch contacts contained in said insulator means and electrically associated with respective ones of said busbars, a second set of switch contacts contained in said insulator means between said busbars and electrically associated with respective ones of said output terminals, first and second sets of switch blades, means insulatedly attaching said switch blades to said cover so that when said cover is in said closed position the blades of said first set of switch blades are in electrical contact with respective ones of said busbars and said first switch contacts and the blades of the second set of switch blades are in electrical contact with the respective output terminals and said second switch contacts and so that the switch blades are all isolated from the switch contacts when the cover is in its open position, and fuses received on said cover to interconnect respective ones of the switch blades of the first and second sets of switch blades.

2. A tap-off assembly according to claim 1 in which said pivot means are disposed on said trunking side walls with said transverse hinge axis intersecting said busbars.

3. A tap-off assembly according to claim 1 in which said cover has deep side flanges for overlying the side walls of the trunking to which said side arms are attached.

4. A tap-off assembly according to claim 1 together with baffle means inside said cover for barring access to the interior of the trunking unless said contact blades are fully disengaged.

5. A tap-off assembly according to claim 1 in which all said switch blades of said record set are disposed on said cover equidistantly from said hinge axis.

6. A tap-off assembly according to claim 1 in which all said switch blades of said first set are disposed on said cover equidistantly from said hinge axis.

7. A tap-off assembly according to claim 1 in which said insulating means comprise a separate insulator bodies in which respective ones of said contacts of said first set are individually housed.

8. A tap-off assembly according to claim 1 in which the contacts of the second set are housed in the same insulator bodies as the corresponding contacts of said first set.

9. A tap-off assembly according to claim 1 in which said insulating means comprise separate insulator bodies in which respective ones of said contacts of said second set are individually housed.

10. A tap-off assembly according to claim 1, in which said tap-off unit includes an internal insulating cover covering the second set of switch contacts and being removable to give access to said output terminals.

11. A tap-off assembly according to claim 1, in which said tap-off unit further comprises a separate insulating cover covering the first set of switch contacts.

12. A tap-off assembly according to claim 1 in which each switch contact of said first set is provided with spring means for clamping the inserted switch blade against the respective busbar.

13. A tap-off assembly according to claim 1, in which said insulator means has cavities therein, means are provided for loosely securing said output terminals in respective ones of said cavities, and each contact of said second set of switch contacts is provided with spring means for clamping the inserted switch blade against the respective output terminal.

* * * * *